(12) United States Patent
Phillips et al.

(10) Patent No.: US 10,677,686 B2
(45) Date of Patent: Jun. 9, 2020

(54) METHOD AND APPARATUS FOR AUTONOMOUS SYSTEM PERFORMANCE AND GRADING

(71) Applicant: GM GLOBAL TECHNOLOGY OPERATIONS LLC, Detroit, MI (US)

(72) Inventors: Matthew E. Phillips, Calabasas, CA (US); Nandan Thor, San Luis Obispo, CA (US); Dylan T. Bergstedt, Sherman Oaks, CA (US); Jaehoon Choe, Agoura Hills, CA (US); Michael J. Daily, Thousand Oaks, CA (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 204 days.

(21) Appl. No.: 15/811,846

(22) Filed: Nov. 14, 2017

(65) Prior Publication Data
US 2019/0145860 A1     May 16, 2019

(51) Int. Cl.
*G01M 17/007* (2006.01)
*G05D 1/00* (2006.01)

(52) U.S. Cl.
CPC ........ *G01M 17/007* (2013.01); *G05D 1/0088* (2013.01)

(58) Field of Classification Search
CPC .................... G01M 17/007; G05D 1/0088
USPC ............................................. 701/33.9
See application file for complete search history.

(56) References Cited

U.S. PATENT DOCUMENTS

| 9,645,577 B1* | 5/2017 | Frazzoli | G05D 1/0214 |
| 2013/0081053 A1* | 3/2013 | Levien | G06Q 10/06 |
| | | | 718/107 |
| 2016/0362118 A1* | 12/2016 | Mollicone | B60W 40/09 |
| 2017/0305434 A1* | 10/2017 | Ratnasingam | B60W 40/09 |

\* cited by examiner

*Primary Examiner* — Krishnan Ramesh
(74) *Attorney, Agent, or Firm* — Lorenz & Kopf LLP

(57) ABSTRACT

The present application generally relates to methods and apparatus for evaluating and assigning a performance metric to a driver response to a driving scenario. More specifically, the application teaches a method and apparatus for breaking a scenario into features, assigning each feature a grade and generating an overall grade in response to a weighted combination of the grades.

12 Claims, 3 Drawing Sheets

METHOD AND APPARATUS FOR AUTONOMOUS SYSTEM PERFORMANCE AND GRADING

BACKGROUND

The present application generally relates to vehicle control systems and autonomous vehicles. More specifically, the application teaches a method and apparatus for evaluating and quantifying the performance of any driven, semiautonomous, or autonomous vehicle traversing a simulation environment as a measure to assess, and subsequently train, a cognitive model of autonomous driving.

BACKGROUND INFORMATION

In general, an autonomous vehicle is a vehicle that is capable of monitoring external information through vehicle sensors, recognizing a road situation in response to the external information, and manipulation of a vehicle. Autonomous vehicle software is tested, evaluated and refined by running the software against various test scenarios to determine the performance of the software and the frequency of success and failure. It is desirable to quantify the performance of different autonomous driving systems and subsystems through a general grading algorithm to provide autonomous vehicle control system with positive and negative evaluations of driving training data in a framework to distinguish the best autonomous driving system. This will provide concrete insights into the performance of different autonomous driving systems in order to inform decision making in the future.

The above information disclosed in this background section is only for enhancement of understanding of the background of the invention and therefore it may contain information that does not form the prior art that is already known in this country to a person of ordinary skill in the art.

SUMMARY

Embodiments according to the present disclosure provide a number of advantages. For example, embodiments according to the present disclosure may enable testing of autonomous vehicle software, subsystems and the like rapidly with only periodic human intervention. This system may further be employed to test other control system software and is not limited to autonomous vehicles.

In accordance with an aspect of the present invention, an apparatus comprising a sensor interface for generating sensor data for coupling to a vehicle control system, a control system interface for receiving a control data from the vehicle control system, a memory for storing a scenario wherein the first scenario is divided into a first feature and a second feature, and a processor for comparing the control data to the first feature to generate a first grade and comparing the control data to the second feature to generate a second grade, weighting the first grade to generate a first weighted grade and weighting the second grade to generate a second weighted grade, and generating a performance metric in response to the first weighted grade and the second weighted grade.

In accordance with another aspect of the present invention, a method comprising receiving a control data indicative of a driver performance, comparing the control data to a driving scenario, wherein the driving scenario has a first feature and a second feature, assigning a first grade to the first feature and a second grade to the second feature, weighting the first grade to generate a first weighted grade and weighting the second grade to generate a second weighted grade, and generating a performance metric in response to the first weighted grade and the second weighted grade.

In accordance with another aspect of the present invention, a method for generating a performance metric for a driving system comprising generating sensor data for coupling to a vehicle control system, receiving a control data indicating a driver response to a driving scenario wherein the driving scenario has a first feature and a second feature, comparing the driver response to the first feature to generate a first grade and comparing the driver response to the second feature to generate a second grade, generating an overall grade in response to the first grade and the second grade, and generating a performance metric indicative to the driver response to the driving scenario in response to the overall grade The above advantage and other advantages and features of the present disclosure will be apparent from the following detailed description of the preferred embodiments when taken in connection with the accompanying drawings.

BRIEF DESCRIPTION OF THE DRAWINGS

The above-mentioned and other features and advantages of this invention, and the manner of attaining them, will become more apparent and the invention will be better understood by reference to the following description of embodiments of the invention taken in conjunction with the accompanying drawings, wherein.

Figure 1:
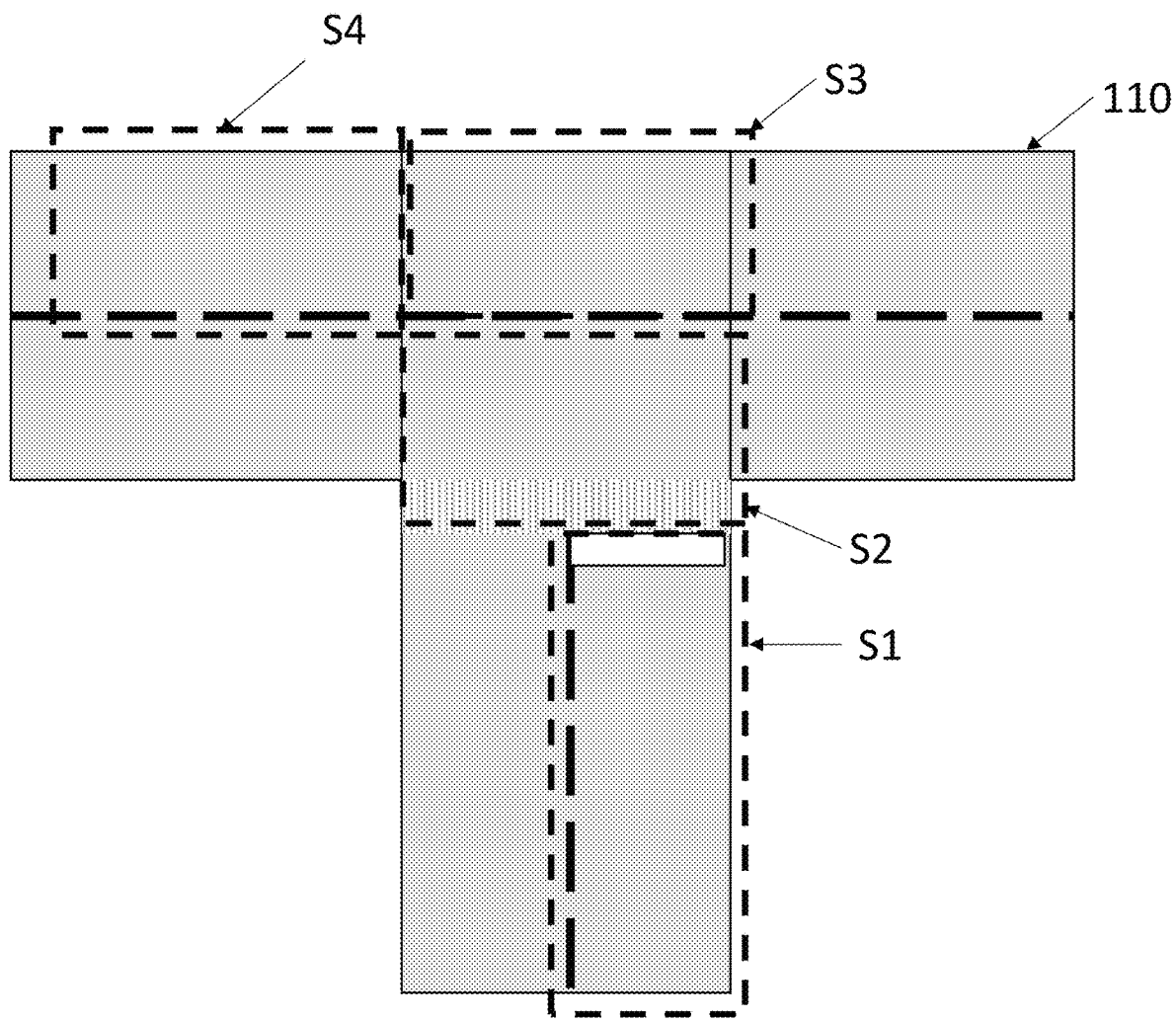
FIG. 1 is an exemplary left turn scenario according to an embodiment.

The exemplifications set out herein illustrate preferred embodiments of the invention, and such exemplifications are not to be construed as limiting the scope of the invention in any manner.

DETAILED DESCRIPTION

The following detailed description is merely exemplary in nature and is not intended to limit the disclosure or the application and uses thereof. Furthermore, there is no intention to be bound by any theory presented in the preceding background or the following detailed description. For example, the algorithms, software and systems of the present invention have particular application for use on a vehicle. However, as will be appreciated by those skilled in the art, the invention may have other applications.

It is desirable to have a grading algorithm in order to quantify and evaluate the performance of any driven, semi-autonomous or fully autonomous car traversing a simulation environment. A grading algorithm is developed with features used to calculate the grade at the end of each driving trial, derived from features such as stopping velocity, velocity-weighted mean distance from an ideal path, velocity-weighted maximum distance from an ideal path, post-left-turn matching of traffic speed, mean distance from other cars, surprise, and critical errors. Also critical is the process of weighting these features approximately to compute a grade for training machine learning systems and evaluating and benchmarking the performance of vehicle control system. This method and system are operative to quantify the performance of an instance of any driving trial in simulation to provide feedback to train an autonomous driving control system and to compare and tune subsystems of an autonomous driving system with alternatives including human-in-the-loop driving and rule-based autonomous driving. This would allow for comprehensive training of any autonomous driving system with verifiably positive and negative instances. Further, this also allows for an unbiased and consistent basis for comparison between different driving systems that will ultimately demonstrate which system is the most effective. This system also provides a framework to identify and mitigate a fundamental issue with traditional rule-based driving systems. While contemporary systems fail to adequately grade and quantify a novel driving situation for which it does not have a rule, the exemplary framework includes continuous grading during a driving trial, which allows for the linkage of discrete driving grade characteristics to explicit events. Finally, the use of the grading algorithm can quantify the level of inherent safety, or need of safety elements, within a given driving situation.

The proposed system employs feature weighting using a regression model to determine the grading algorithm feature coefficients based on human grading scores. The use of the grade as a basis for comparison between different driving systems, such as human-in-the-loop and cognitive model, and the interaction between grade scores and complexity scores creates a complete representation of autonomous system performance by breaking driving trials into time parsed subtasks that create granularity in the grading algorithm and to enable supervision of auto-generated training datasets.

Future applications for the currently disclosed method and system include utilization of grade score data trends to focus improvement efforts of sensors, cameras, and other new technologies, the use of grading algorithm to identify unsafe driving subsections of roads, and anonymous grading of non-autonomous drivers to provide vehicle use information. With autonomous driving technologies becoming increasingly important future applications of this grading algorithm may be used to pinpoint research and development efforts and situational safety evaluations.

The concept of critical errors is used to identify trials that fail to achieve their goal or fail to achieve safe driving. Critical failures within the abovementioned exemplar may include failure to come to a complete stop at the stop sign, a collision involving the autonomous vehicle, and/or the failure of the car to complete the left turn. If any of these events occur, a score of zero may be given in order to show that critical goals of the scenario is not achieved. An exemplary critical error factor may be a binary score used to multiply a generated performance metric. The identification of these critical errors also make it possible to train a cognitive model on a subset of negative driving instances that are not merely undesirable, but to be avoided at all costs.

To ensure that the current grading system makes sense, the notion of complexity is introduced. The introduction of a complexity metric allows for a complexity value to be computed during a discrete time point or throughout an entire autonomous driving task. By taking generated data and extracting a measure of complexity, the autonomous vehicle system may determine a basis for scenario comparison and a basis for taking action based on previous situations with similar complexity scores. Attentional demand of the autonomous system can then be based on complexity. The complexity measure ultimately feeds in to a cognitive model, along with grading scores, to guide decision making during training. The complexity calculation and grading scoring are further used to analyze the performance of all of the autonomous systems. Complexity may be divided into subcategories such as criticality, alternatives, perceptual complexity, and decision speed and intent predictions. By mapping outputs from a simulation to these five complexity categories, a measure of complexity can be estimated.

Turning now to FIG. 1, an exemplary left turn scenario is shown. In order to generate an accurate and meaningful complexity metric, the scenario is divided into subtasks. The T junction road surface 110 is shown where a vehicle approaches from the lower road S1 and navigates a left turn across one lane of traffic. The introduction of a complexity metric allows a complexity value to be computed at the subtask level during an autonomous driving task. By taking data that is generated during simulation and extracting a measure of complexity, the autonomous vehicle creates a basis for scenario comparison and a basis for taking action based on previous situations with similar complexity scores. Attentional demand of the autonomous system can then be based on complexity. The complexity measure ultimately feeds in to the cognitive model, along with grading scores, to guide decision making. In this exemplary embodiment, the evaluation is performed on a left hand turn scenario. Within this scenario there are many iterations that can occur based on, for example, traffic density, number of pedestrians, weather conditions, etc. In order to measure complexity, the main task of making a left-hand turn is broken down into subtasks. In this exemplary embodiment, the main task of making a left turn is broken up into four subtasks S1, S2, S3 and S4. In order to allow for scalability to other scenarios, features of the subtasks are found to build a set of guidelines to break the data into subtasks. Subtask 1's S1 endpoint is determined by finding the time point where the car's velocity drops below a certain acceptable stopping speed. Subtask 2's S2 endpoint is then found when the car exceeds a certain acceleration velocity. Subtask 3's S3 endpoint is located by looking at when the x-coordinate of the car stops changing. It is assumed that the endpoint of one subtask is the beginning point of the next subtask. These features that determine the end of respective subtasks should be scalable to most simple left-turn scenarios but it will depend on the aggressiveness of the driver and other drivers within the scenario, familiarity with the road, and simplicity of the left turn task.

The purpose of breaking the left-turn task into subtasks is to determine complexity changes based on where in the task complexity is measured. By splitting the task into subtasks, it is possible to see how complexity changes among different parts in the task but also how complexity changes over time. By chunking the task into subtasks, complexity can be calculated within each subtask and complexity can be calculated among subtasks as a function of time. Inherently, complexity changes from subtask 1 S1 to subtask 2 S2 demonstrate a difference in complexity over time. However, within a subtask, features are generally the same, so measuring differences among subtasks yields a non-trivial temporal difference in complexity. Generally, subtasks are determined based on difference of features, which allows for a natural temporal complexity comparison between subtasks. Certainly, there may be some features that change within a subtask but fundamental to how subtasks are broken down is a minimization of those feature changes. Depending on the application, it may be of interest to measure how complexity changes temporally throughout the entire task or exclusively in one subtask. Since subtasks are continuous (the endpoint of one is the starting point of the next), both large-scale (throughout a task) and small-scale (throughout a subtask) temporal complexity can be calculated and we postulate that our future efforts will extrapolate these complexity measures to a continuous or discrete event-related time domain.

The performance of a vehicle is evaluated to quantitatively determine how well a certain instance of a specific driving scenario, such as the left turn task is safely executed. In this approach the autonomous vehicle interacts with Human-in-the-Loop (HIL) vehicle models in an environment with a large number of safety-critical scenarios extracted from real-world driving. This safety evaluation is based on five subcategories as defined subsequently. The data for the autonomous car is acquired using both the rule based system as well as the human-in-the-loop (HIL) system in order to build the grading algorithm. The score that is computed based on the performance of the autonomous vehicle in the five subtasks outlined below, is referred to as the grade. The features that are used to determine this grade in the exemplary left turn simulation environment include: mean distance from closest agent after the left turn, stopping velocity at the stop sign, post-left turn matching of traffic speed, mean distance from the ideal path, maximum distance from the ideal path, and surprise actions of other agents in the scene. Other simulation environments may include additional features that are relevant to the particular scenario at hand.

The first feature that is used to compute the grade is post-left turn matching of traffic speed. The velocity of the driver, in the autonomous system or HIL system, relative to the most proximal vehicle within its lane is acquired using self-port data. The self-port data is also known as ground truth data and it assumes omniscience of all of the agents in the scene. By using self-port data, the most complete representation of the driver's score is found. Alternatively, more realistic sensors, such as radar or LiDAR may be used. The driver receives a lower score when the velocity of the autonomous car is not equal to the speed of traffic. The system/driver is only penalized for not matching the speed of traffic after the left turn had been executed in order to provide time for the vehicle to increase velocity after stopping at the stop sign. The absolute value of the difference in self speed and the speed of traffic is taken in order to give an equal penalty for driving too slowly or too quickly. If the autonomous vehicle is within four meters per second of the speed of surrounding traffic for example, the driver is not penalized. It is assumed that the more rapidly the autonomous car can reach traffic speeds, the better and the safer the driving instance.

The next feature that is used to compute the grading score is the minimum distance from the autonomous vehicle to other agents. The distance between the autonomous vehicle and all other agents in the scenario is continuously recorded at each time step in the scenario. When the autonomous vehicle was determined to be within a certain dynamic distance to another vehicle, these values and time steps are recorded and the driver is penalized based on the amount of time spent within the certain dynamic distance during the trial. For example, it may be recommended that the dynamic safe distance requires drivers to stay at least two seconds behind the vehicle being followed. Thus, the safe distance is calculated by multiplying two by the velocity of the autonomous vehicle at a given time t. It is assumed that the less time spent within the limits of the dynamic following distance, the better the driving instance.

Another feature that is used to calculate the grading score is the distance from a predetermined ideal path. An ideal left turn path is determined using and inherent path generator. The inherent path generator may determine the optimal left turn path to take during the left turn, which incorporates the smoothness of the left turn as well as ensuring staying in the middle of each respective left turn lane and merge lane. The location of the autonomous vehicle at each time point is compared to every spatial locations on the ideal path. This is repeated for every time step as the autonomous car makes the left turn. This measure removes the temporal dimension of grading the turn in order to prevent from penalizing minor differences in velocity. Then, the minimum distance from the autonomous vehicle's spatial location at time t to every point on the ideal path is recorded as the autonomous vehicle's deviation from the ideal path. In order to prevent short, wide deviations from the ideal path from having a minimal effect on this aspect of grading, the distance is multiplied by the velocity at each time. This further prevents a car from stopping perfectly on the ideal path and receiving a perfect score. Both the velocity-weighted average deviation and velocity-weighted maximum deviation from the ideal path are recorded in order to quantify how well the autonomous vehicle follows the ideal path. It is assumed that the more closely that the autonomous vehicle follows the ideal path, the better the driving instance.

Another feature that may contribute to the grading of the driving trial is whether the autonomous vehicle completely stops at the stop sign. The velocity of the vehicle is recorded when the autonomous vehicle reaches its minimum Euclidian distance from the stop sign. The value for the spatial location of the stop sign is predetermined and it is assumed that the stop sign does not move. If the velocity at this stopping location and time t is not less than 0.01, for example, the system/driver is penalized for running the stop sign. The greater the velocity at the stop sign, the greater the penalty. The penalty may scale linearly with the stopping velocity. If the stopping velocity exceeds 2 meters per second, a critical error is received for that driving instance, as we assume that the car did not stop at the stop sign, which would result in an automatic failure indicative of an unsafe driving instance.

The final factor that is introduced in order to calculate a grade for a certain trial is the factor of surprise. This feature is useful to incorporate in order to determine the performance of the system in unseen or novel instances. Ultimately, this will be the evaluation of the cognitive model's prediction of other agent's intentions at a specific time. Further, this prediction has a certain confidence attached to it, so if the confidence is high but the prediction is ultimately incorrect, the system is penalized higher than if the incorrect prediction has a lower confidence. Alternatively, if the system correctly predicts the intentions of other agents, it is rewarded in this category of the grade. If traffic performs in a way that is not predicted by the cognitive model, such as when an agent stalls in traffic, this is considered a surprise. If the autonomous vehicle can still successfully complete the turn despite this unexpected event, then a high grade will be awarded. If there is no surprise event present in the driving trial, the autonomous vehicle was not penalized.

Figure 2:
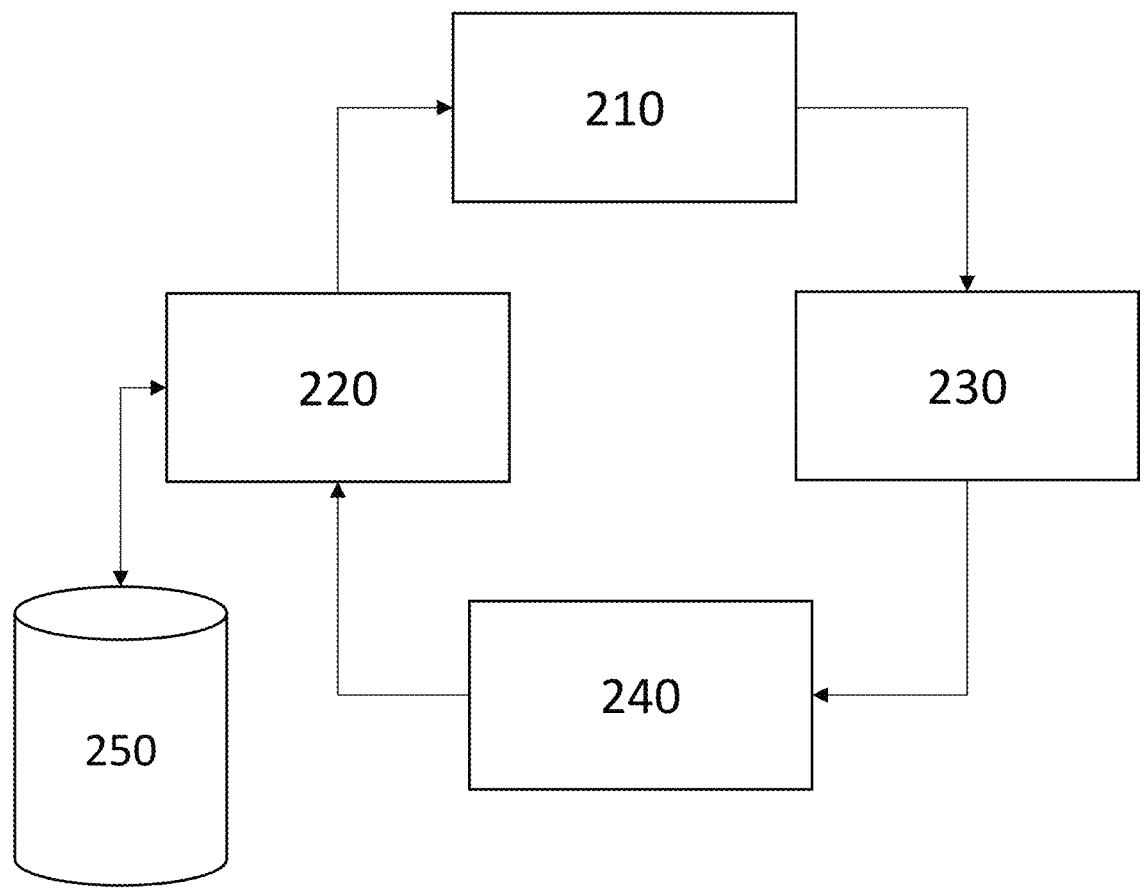
FIG. 2 is an exemplary apparatus for implementing the method for autonomous system performance and grading according to an embodiment.

Turning now to FIG. 2, an exemplary apparatus 200 for implementing the method for autonomous system performance and grading is shown. The apparatus 200 is operative to simulate a driving scenario for evaluation and quantifying the performance of a driving system, including an autonomous driving system. The apparatus is used to quantify the cognitive cost and effort required by a driver, or driving system, to successfully complete the scenario. The apparatus comprises a simulator 220, a sensor interface 210, a control system interface 240 and a memory 250. The sensor interface 210 and the control system interface 240 are operative to interact with the vehicle control system. The apparatus may be implemented in hardware, software or a combination of both.

The simulator 220 is operative to simulate the driving environment and scenario and generate control signals for controlling the sensor interface 210. The sensor interface 210 is operative to generate sensor signals that are readable by the vehicle control system 230. The sensor signals interface with the vehicle control system 230 such that it appears to the vehicle control system that it is operating in the actual environment. The control system interface 240 receives control signals generated by the vehicle control system 230. The control system interface 240 translates these control signals into data used by the simulator 220 as feedback from the scenario. The scenarios are stored on the memory 250 which is accessed by the simulator. The simulator is further operative to store additional information and updates to the scenarios and complexity metrics on the memory 250.

In order to make sure that the grading scores make sense in the context of complexity, weighting of the grading and complexity features is introduced. Initially, an objective human gives grades and complexity scores for ten runs of scenarios with varying complexity in the left-turn simulation environment. This allows for the human scores to be compared to the scores that the grading and complexity algorithms calculate. Because the human only gives one respective complexity score and grade for the entire scenario, it is assumed that the one score is representative of all grading features and of all complexity features, respectively. With each grading and complexity feature being given a certain score by the grading and complexity calculations, the human scores are regressed against the grading calculation and complexity scores. In the first multiple regression, the grading scores of each feature for grade, surprise, velocity-weighted mean deviation from an ideal path, velocity-weighted maximum deviation from an ideal path, post left turn matching of speed, stopping velocity, and mean distance from other cars are the predictors and the human scores are the responses in the multiple regression.

Similarly, in the second multiple regression for complexity, the scores of each feature, surprise, criticality, alternatives, perceptual complexity, and decision speed, are the predictors and the human scores are the responses in the multiple regression. The coefficients that are produced by these regressions become the weights of the individual features that make up the grading and complexity calculations. This initial weighting gives a basis for the weighting of the grading and complexity scores and the fine tuning of the weights come from the results from the automated trials.

Using the human-weighted scores for the grading and complexity calculations, the grading algorithm and the complexity algorithm may then be batch processed to create the grading and complexity scores for all of the automated trials. The varying features of the automated trials are the number of other actors in the scenario and their average speed. The assumption may be made that complexity increases as the number of actors increase and complexity increases as the average speed of those actors increase. Weighting is an iterative process and the respective features used to calculate both complexity and grading and the relative weighting of those features may continue to change as the system evolves and as more data is generated. Grades are calculated for every HIL trial and then the complexity of the HIL trials are calculated with weightings. Novel trials can be executed and the results for complexity and grade may be compared to previous HIL results and to previous automated trial results. An exemplary novel scenario may be the case of a car that merges into the left turn lane of the intersection but then stalls. This scenario is demonstrative of the shortcomings of a traditional rule based system that has no rule for a stalled car, assuming it has never encountered this situation before. The novel scenario would be high complexity because we have no training data on this situation and because the stalled car is blocking our path to make the left turn. At lower complexity scenarios, the autonomous vehicle and human driver perform comparably as the low complexity scenario did not pose a significant challenge to either the HIL driver or the rule-based system. Because neither system was challenged, there is not a large difference in grading scores between the HIL driver and the autonomous system. The score of the autonomous system falls within the range set by the HIL driver. At this low complexity, both the human and the rule-based system reached a grade ceiling of how well they could perform based on the grading features described above.

An exemplary high complexity scenario involves a vehicle stalling in the left turn lane that the autonomous car needs to pass through in order to complete the objective left turn. This results in a higher complexity score because the actor is behaving in a way that has not been previously observed. The traditional rule-based system fails in this new high complexity scenario as the system does not know how to respond to a situation in which it does not have a corresponding rule, and thus the system fails to complete the left-turn task. Because this new scenario is a novel situation, no rule has been created to deal with a stalled car which is a fundamental flaw of the rule-based system. This flaw is resolved by the cognitive model which ultimately allows the autonomous car to complete the left turn. This behavior may be graded accordingly using residual data completed from a very similar scenario (e.g. the exemplar under discussion above), but with the corresponding increase in complexity measures. Because of the granularity of the subtask grades, the system may still generate usable and consistent grading outputs, even for novel situations.

Figure 3:
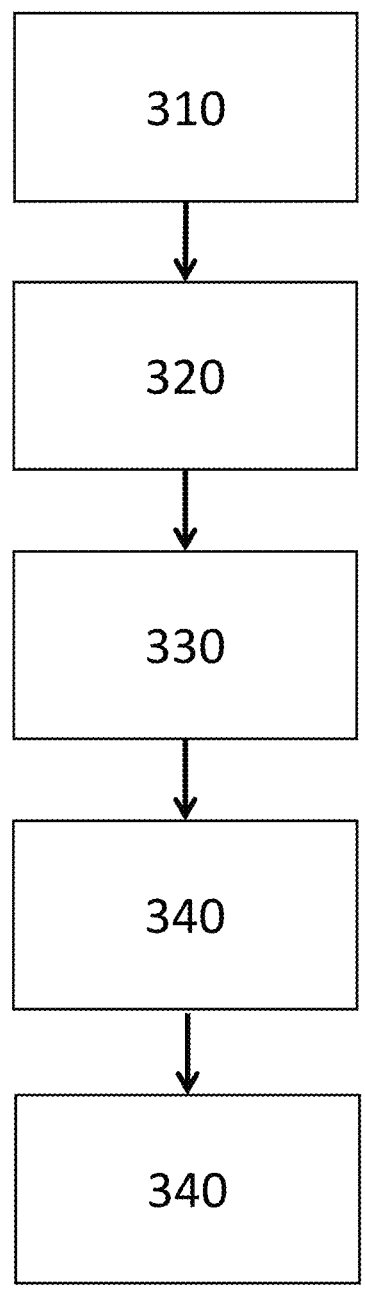
FIG. 3 is an exemplary method for autonomous system performance and grading according to an embodiment.

Turning now to FIG. 3, an exemplary method for autonomous system performance metric generation and benchmarking 300 is shown. The method is first operative to receive a control data indicative of a driver performance 310. The method then compares the control data to a driving scenario, wherein the driving scenario has a first feature and a second feature 320. The exemplary method is then operative to assign a first grade to the first feature and a second grade to the second feature 330. The method then weights the first grade to generate a first weighted grade and weighting the second grade to generate a second weighted grade 340. The method then generates a performance metric in response to the first weighted grade and the second weighted grade 340. The control data may be generated in response to a human driver performance or an autonomous driving control system performance.

The performance metric may be indicative of the driver performance compared to an optimal performance of the scenario. This performance metric may be transmitted back to a driver or an autonomous driving control system in order to improve future driver performance. The exemplary method is not limited to two features and may evaluate any number of features in order to generate a performance metric. Evaluated features may include stopping velocity, velocity weighted mean distance from an ideal path, post left turn matching of traffic speed, mean distance from other cars, surprise and critical error. In a further exemplary configuration, the first feature may have a first complexity and the second feature having a second complexity and wherein the performance metric is generated in response to the first weighted grade, the second weighted grade, the first complexity and the second complexity. The performance metric may be further weighted in response to a binary critical error factor. Again, the driver may be a human driver, a partial assist autonomous driving system or a fully autonomous driving system.

What is claimed is:

1. An apparatus comprising:
   a sensor interface for generating sensor data for coupling to a vehicle control system;
   a control system interface for receiving a control data from the vehicle control system;
   a memory for storing a driving scenario wherein the driving scenario has a first time parsed subtask and a second time parsed subtask wherein the first time parsed subtask has a first complexity and the second time parsed subtask has a second complexity; and
   a processor for comparing the control data to the driving scenario, assigning a first grade to the first time parsed subtask and a second grade to the second time parsed subtask, weighting the first grade to generate a first weighted grade and weighting the second grade to generate a second weighted grade, and generating a performance metric based on the first weighted grade, the second weighted grade, the first complexity and the second complexity.

2. The apparatus of claim 1 wherein the performance metric is indicative of a driver performance compared to an optimal performance of the scenario.

3. The apparatus of claim 1 wherein the first time parsed subtask is at least one of stopping velocity, velocity weighted mean distance from an ideal path, post left turn matching of traffic speed, mean distance from other cars, surprise and critical error.

4. The apparatus of claim 1 wherein the control data is generated by an autonomous driving control system.

5. The apparatus of claim 4 wherein the performance metric is transmitted to the autonomous driving control system.

6. The apparatus of claim 1 wherein the performance metric is generated in response to a critical error factor, the first weighted grade and the second weighted grade.

7. A method of driver performance evaluation comprising:
   receiving a control data indicative of a driver performance;
   comparing the control data to a driving scenario, wherein the driving scenario has a first time parsed subtask and a second time parsed subtask wherein the first time parsed subtask has a first complexity and the second time parsed subtask has a second complexity;
   assigning a first grade to the first time parsed subtask and a second grade to the second time parsed subtask;
   weighting the first grade to generate a first weighted grade and weighting the second grade to generate a second weighted grade; and
   generating a performance metric based on the first weighted grade, the second weighted grade, the first complexity and the second complexity.

8. The method of claim 7 wherein the performance metric is indicative of the driver performance compared to an optimal performance of the scenario.

9. The method of claim 7 wherein the first time parsed subtask is at least one of stopping velocity, velocity weighted mean distance from an ideal path, post left turn matching of traffic speed, mean distance from other cars, surprise and critical error.

10. The method of claim 7 wherein the control data is generated by an autonomous driving control system.

11. The method of claim 10 wherein the performance metric is transmitted to the autonomous driving control system.

12. The method of claim 7 wherein the performance metric is generated in response to a critical error factor, the first weighted grade and the second weighted grade.

* * * * *